United States Patent
Harrison et al.

(10) Patent No.: US 8,135,066 B2
(45) Date of Patent: Mar. 13, 2012

(54) CONTROL OF DATA PROCESSING

(75) Inventors: Philip Robert Harrison, London (GB); Peter John Marshall, London (GB)

(73) Assignee: Sony Computer Entertainment Europe td (GB)

( * ) Notice: Subject to any disclaimer, the term of this patent is extended or adjusted under 35 U.S.C. 154(b) by 1100 days.

(21) Appl. No.: 11/631,143

(22) PCT Filed: Jun. 29, 2005

(86) PCT No.: PCT/GB2005/002547
§ 371 (c)(1),
(2), (4) Date: Jan. 9, 2008

(87) PCT Pub. No.: WO2006/000824
PCT Pub. Date: Jan. 5, 2006

(65) Prior Publication Data
US 2009/0010335 A1    Jan. 8, 2009

(30) Foreign Application Priority Data
Jun. 29, 2004   (GB) .................................. 0414564.5

(51) Int. Cl.
*H04N 7/12* (2006.01)
(52) U.S. Cl. ............................... 375/240.16; 375/240.26
(58) Field of Classification Search ........................ None
See application file for complete search history.

(56) References Cited

U.S. PATENT DOCUMENTS

| | | | |
|---|---|---|---|
| 4,975,960 A | 12/1990 | Petajan | |
| 5,210,604 A | 5/1993 | Carpenter | |
| 5,548,340 A * | 8/1996 | Bertram | 348/559 |
| 5,704,836 A | 1/1998 | Norton et al. | |
| 6,594,629 B1 | 7/2003 | Basu et al. | |
| RE38,227 E * | 8/2003 | Sugiyama et al. | 386/329 |
| 7,023,913 B1 * | 4/2006 | Monroe | 375/240.01 |
| 2001/0048719 A1 * | 12/2001 | Takeuchi et al. | 375/240.15 |
| 2002/0037770 A1 | 3/2002 | Paul et al. | |
| 2002/0097247 A1 | 7/2002 | Ohba | |
| 2002/0181773 A1 | 12/2002 | Higaki et al. | |
| 2004/0019899 A1 | 1/2004 | Pelletier | |
| 2004/0086091 A1 * | 5/2004 | Naidoo et al. | 379/37 |

(Continued)

FOREIGN PATENT DOCUMENTS

EP    0 683 481 A3    11/1995
(Continued)

OTHER PUBLICATIONS

Communication pursuant to Article 94(3) EPC dated May 16, 2008, from the corresponding European Application.
H. Kaufman, et al. "Designing for Immersive Public Entertainment Spaces" Apr. 23, 2001, http://www.gamasutra.com/features/gdcarchive/2001/kaufman.doc, XP001543613.

(Continued)

*Primary Examiner* — Phirin Sam
(74) *Attorney, Agent, or Firm* — Lerner, David, Littenberg, Krumholz & Mentlik, LLP

(57) ABSTRACT

Data processing apparatus arranged to receive successive images from a video camera and to receive audio data from a microphone comprises means for detecting inter-image motion in the video images; means for detecting audio signals in the associated audio data satisfying one or more predetermined audio criterion; and activation means, for activating a control function of the data processing apparatus in response to a predetermined sequence of a detection of inter-image motion satisfying one or more predetermined motion criterion and a detection of an audio signal in the associated audio data which satisfies the predetermined audio criteria.

7 Claims, 14 Drawing Sheets

U.S. PATENT DOCUMENTS

2004/0117815 A1 6/2004 Kondo et al.
2007/0189604 A1* 8/2007 Baron et al. .................. 382/167

FOREIGN PATENT DOCUMENTS

EP 1 216 730 A 6/2002

OTHER PUBLICATIONS

International Search Report dated Dec. 12, 2005 for PCT Application No. PCT/GB2005/002547.
UK Search Report dated Oct. 1, 2004 for GB0414564.5.

* cited by examiner

CONTROL OF DATA PROCESSING

This application is a National Phase Application of International Application No. PCT/GB2005/002547, filed Jun. 29, 2005, which claims the benefit under 35 U.S.C. 119 (a-e) of GB 0414564.5 filed Jun. 29, 2004, which is herein incorporated by reference.

This invention relates to the control of data processing operations. A particular example involves the control of video game processing operations, but the invention has more general application to other types of data processing.

In a conventional video games machine, a user views the game on a video monitor or television screen, and controls operation of the game using a hand-held keypad or joystick. With some games machines such as the Sony® PlayStation® 2, a handheld controller provides two joysticks and several user-operated keys, along with a vibrating element to provide tactile feedback to the user of events occurring within the game.

It has been proposed that games machines could make use of video cameras. This can allow an image of the user to appear within the game scenario, or for actions by the user, such as waving a "wand" in the air, to be translated into corresponding actions of a character within the game.

A disadvantage of this arrangement is that the user has to operate the handheld controller to switch between game functions, and generally to control operation of the games machine.

This invention provides data processing apparatus arranged to process successive video images and an associated audio signal; the apparatus comprising:

means for detecting inter-image motion in the successive video images;

means for detecting whether the inter-image motion satisfies one or more predetermined motion criteria;

means for detecting an audio signal pattern in the associated audio signal satisfying one or more predetermined audio criteria; and activation means for activating a control function of the data processing apparatus in response to a predetermined grouping of:

(a) a detection of inter-image motion satisfying the one or more predetermined motion criteria; and (b) a detection of an audio signal pattern in the associated audio signal which satisfies the one or more predetermined audio criteria.

The invention provides a technique for activating control functions of a data processing apparatus on the basis of a predetermined sequence of detected motion within an image and detected sound. The invention recognises that a simple detection of motion may not be sufficient to reliably activate a function in response only to a desired motion. It is possible that false detection and therefore unwanted activation could result from motion in the image not designed to trigger activation of a function. Equally, the invention recognises that a simple detection of a sound may not be sufficient to reliably activate a function only in response to the detection of a predetermined sound. Other audible events picked up by a microphone and received by the data processing apparatus, as well as signal processing noise, may trigger a false detection and therefore an unwanted activation. The invention seeks to reduce the likelihood of false detection and false activation occurring by requiring that both predetermined motion and predetermined sound be detected in a predetermined sequence in order for activation of the function to take place.

Preferably both the motion and the sound derive from the same action, for instance a hand-clap. In this case, the inter-image motion detected is that of a hand moving through the image to meet another hand, or of two hands moving towards each other through the image to meet each other. The corresponding detected sound will be that sound resulting from the collision of the two hands. It will therefore be appreciated that the user of a data processing apparatus could activate a function of the apparatus, such as a "pause" function, by the action of a hand clap, with a reduced likelihood of other events, such as a hand clap outside of the field of view of the video camera, or a simple hand wave inside the field of view of the camera, resulting in activation of the function.

It can be appreciated that the data processing apparatus may be responsive to different visual and audio stimuli, or combinations of stimuli to activate other functions. For instance, the function activated may depend on the position of hands at the moment of a hand clap within the field of view of the video camera. Additionally, the apparatus may activate different functions in response to a particular pattern of hand claps, the pattern being either temporal (i.e. predetermined time intervals between each clap) or spatial (the position of the hands corresponding to predetermined areas in the field of view of the webcam) or both.

Preferably, the apparatus will determine, for each of a series of successive images, one or more active image regions where inter-image motion has been detected, and will subsequently determine whether a displacement in location of at least one of the active image regions between successive images is greater than a predetermined threshold. The relevant motion criteria in this case will be that the displacement in location of at least one active image region remains above the predetermined threshold for N successive images and subsequently falls below the predetermined threshold, with N being a predetermined integer. This enables the data processing apparatus to track, for instance, the position of a user's hand from frame to frame to determine whether the user's hand motion meets the predetermined motion criteria.

Preferably the apparatus comprises a video camera for supplying the successive images, and a microphone for supplying audio data.

The invention also provides a data processing method comprising the steps of:

detecting inter-image motion in a series of successive video images;

detecting whether the inter-image motion satisfies one or more predetermined motion criteria;

detecting an audio signal pattern in an associated audio signal satisfying one or more predetermined audio criteria;

activating a control function of a data processing apparatus in response to a predetermined grouping of:

(a) a detection of inter-image motion satisfying the one or more predetermined motion criteria; and (b) a detection of an audio signal pattern in the associated audio signal which satisfies the one or more predetermined audio criteria.

The invention also provides computer software having program code for carrying out a method as above. The computer software is preferably provided by a providing medium such as a transmission medium or a storage medium.

Further respective aspects and features of the invention are defined in the appended claims.

Embodiments of the invention will now be described, by way of example only, with reference to the accompanying drawings in which:

FIG. 1 schematically illustrates the overall system architecture of the PlayStation 2;

FIG. 2 schematically illustrates the architecture of an Emotion Engine;

FIG. 3 schematically illustrates the configuration of a Graphics synthesiser;

Figure 6:
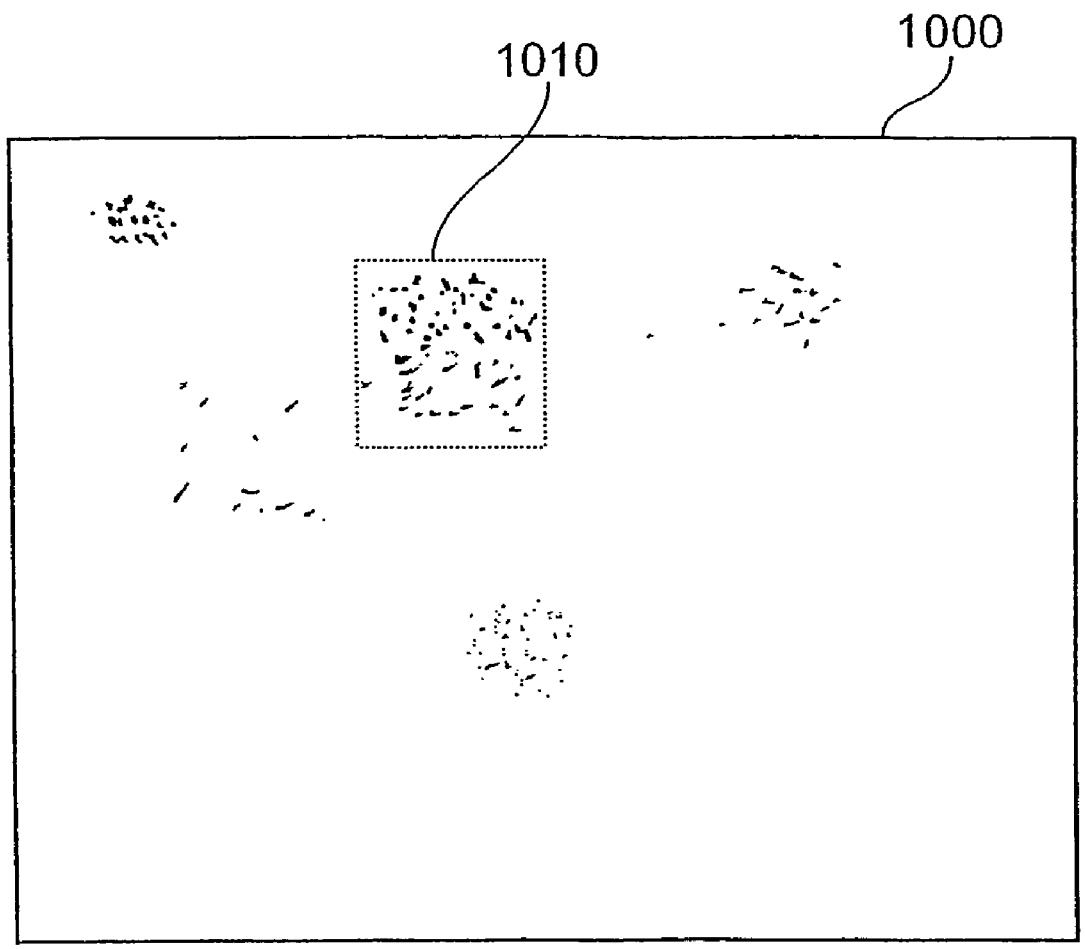
Figure 7A:
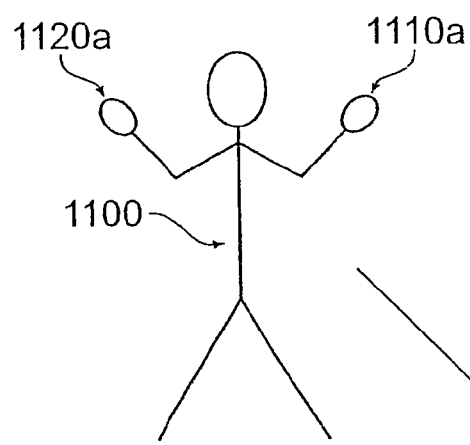
Figure 7B:
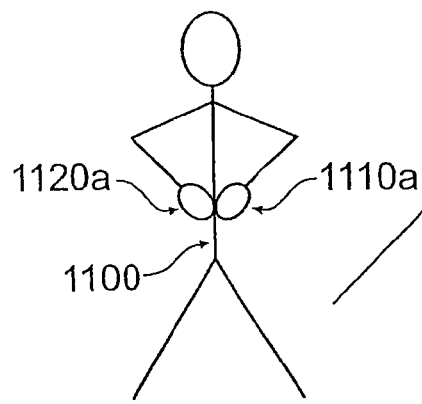
Figure 7C:
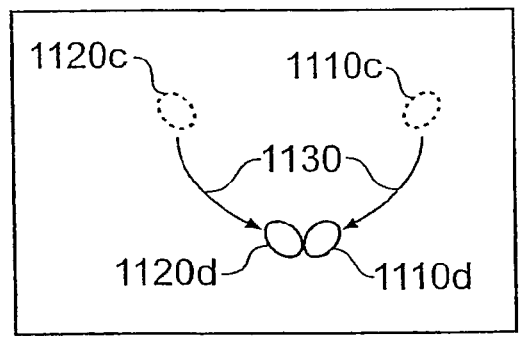
Figure 8:
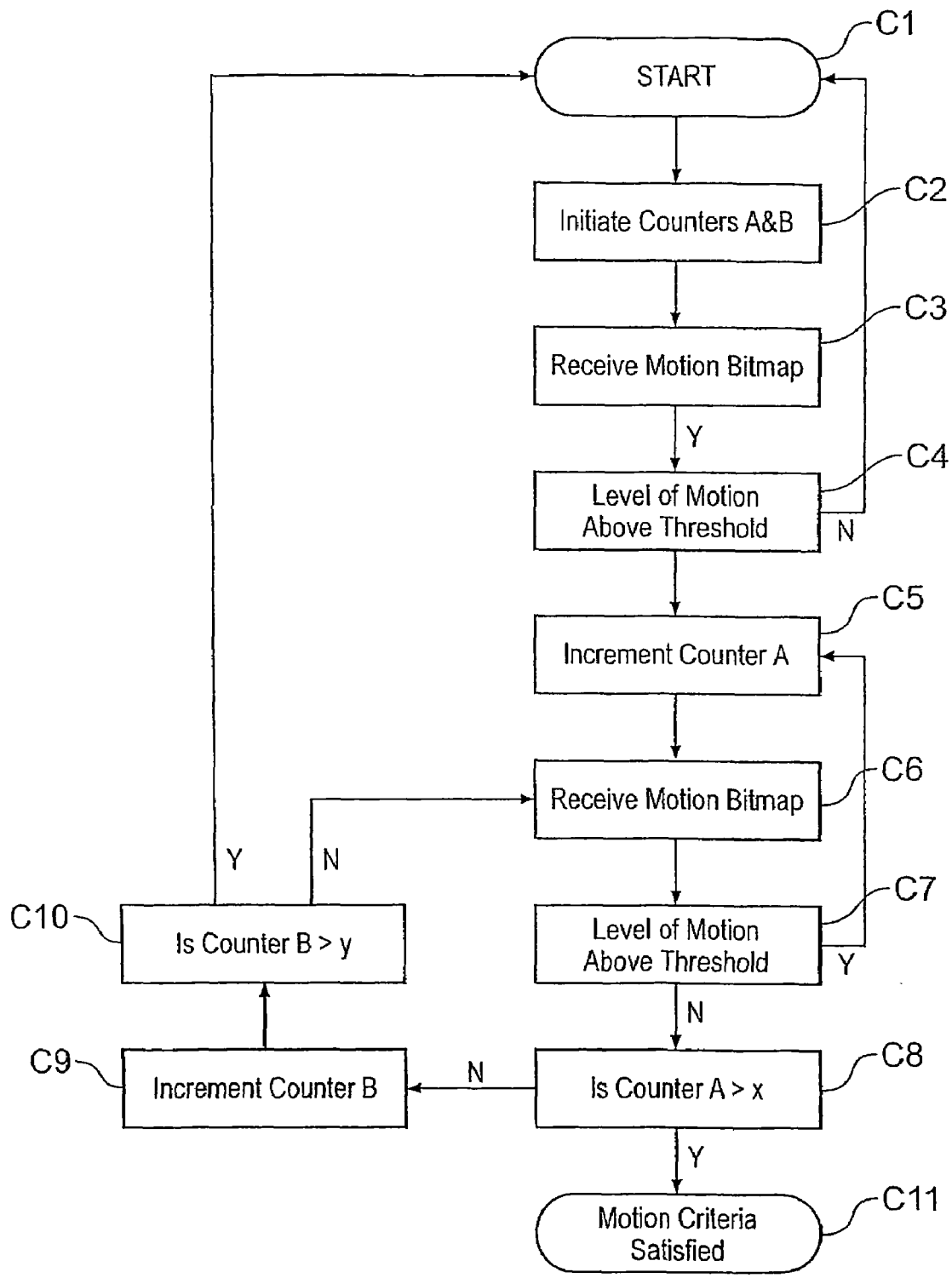
Figure 10:
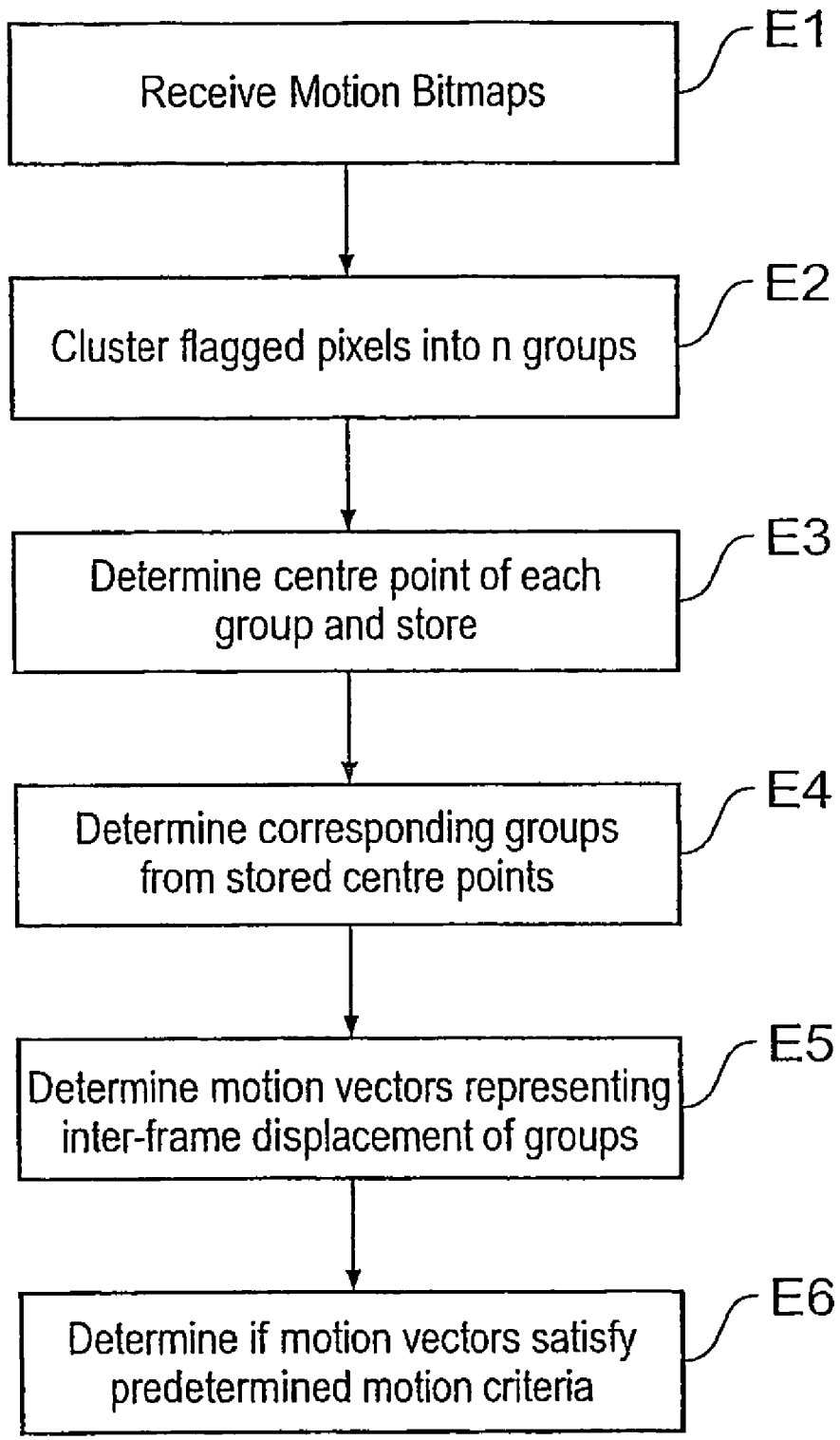
Figure 11A:
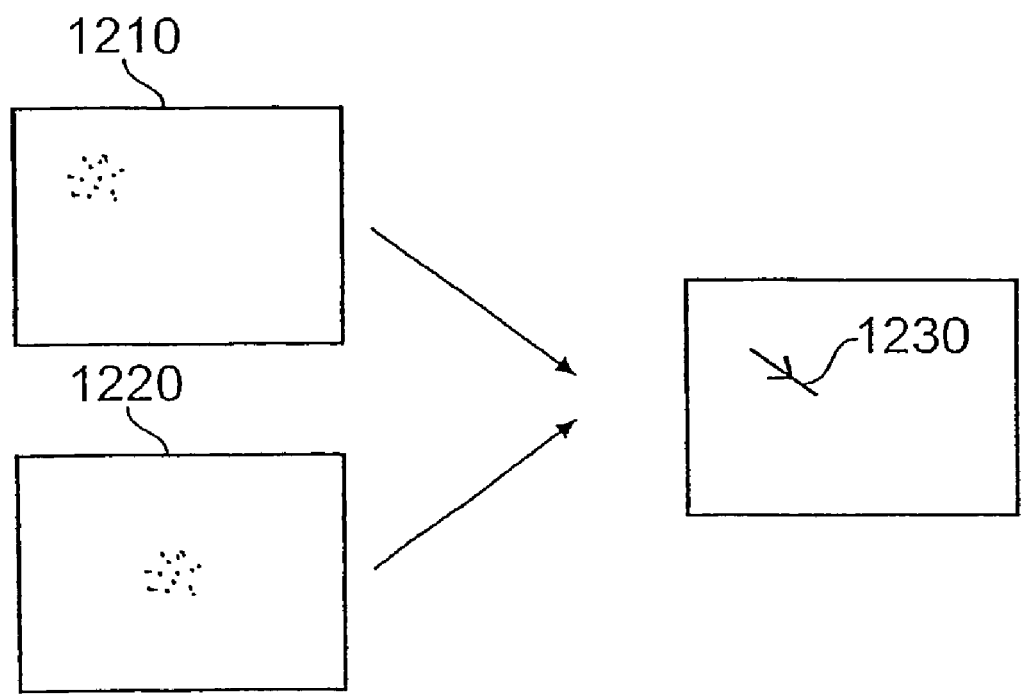
Figure 11B:
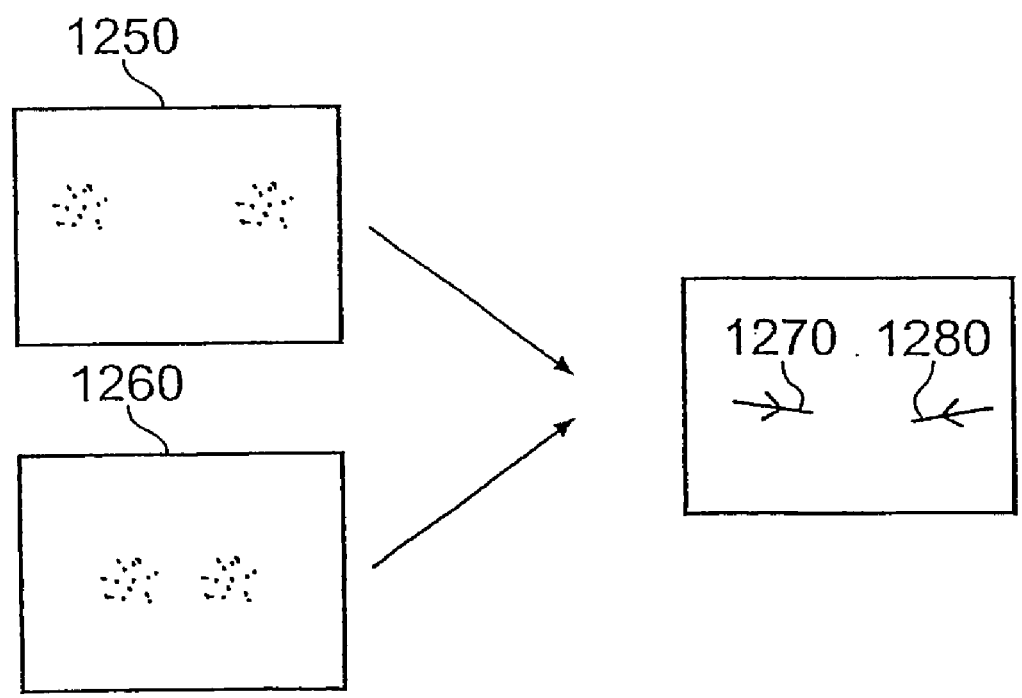
Figure 12:
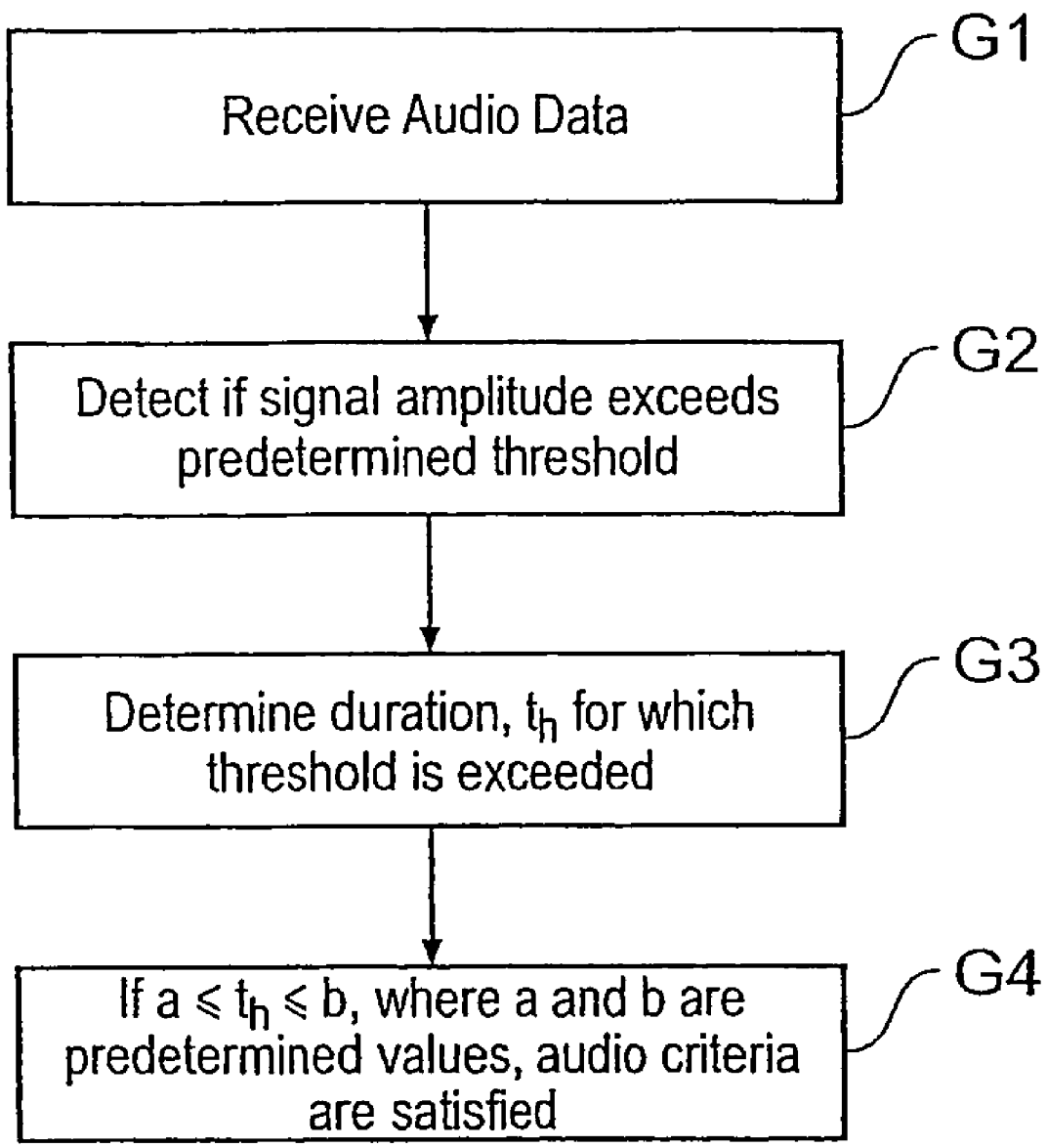
Figure 13:
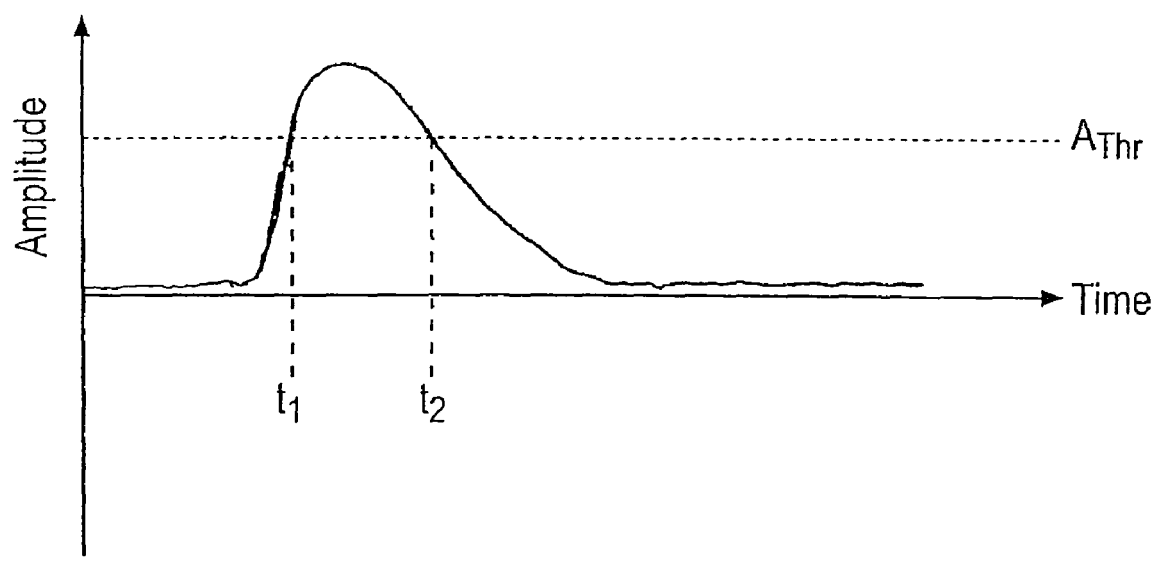
Figure 14A:
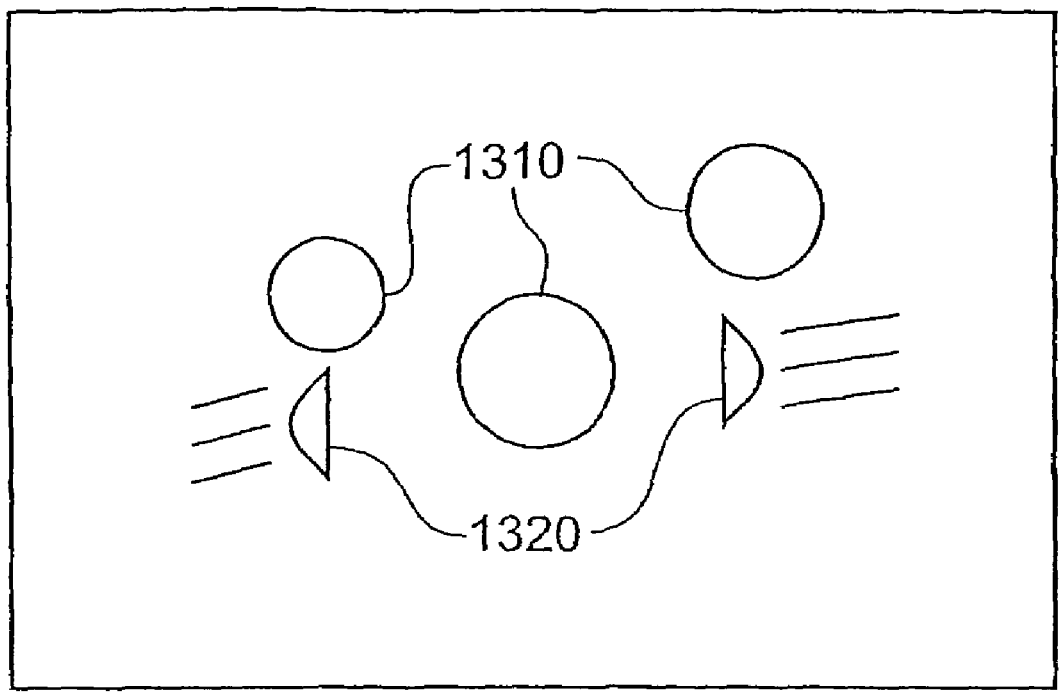
Figure 14B:
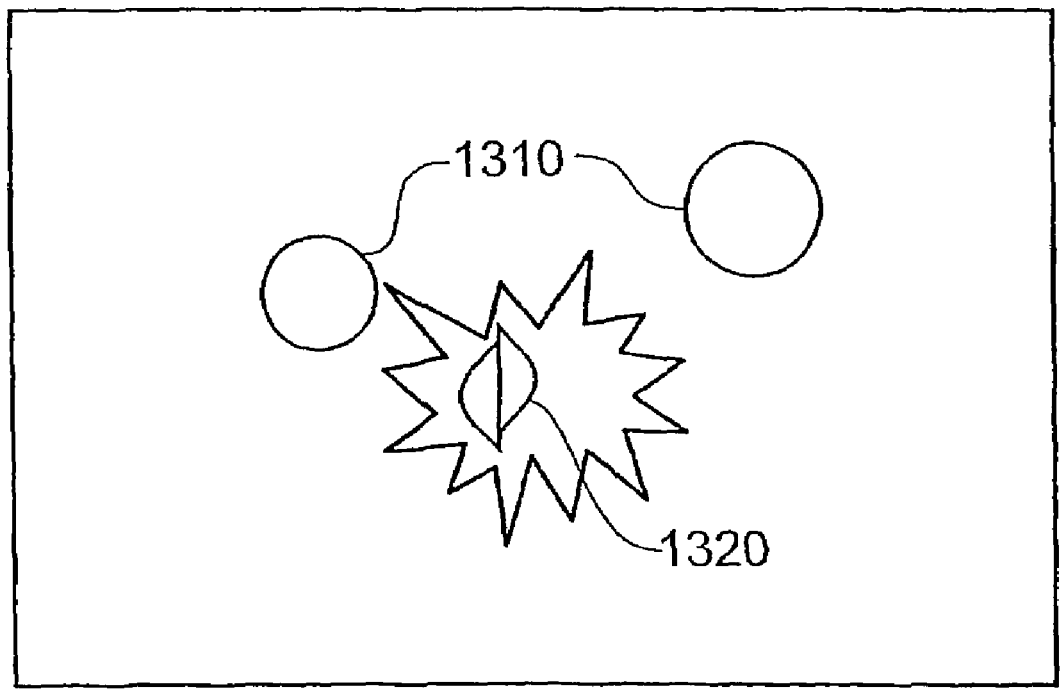

FIG. 6 schematically illustrates a motion bitmap;

FIGS. 7A to 7C schematically illustrate the representation of a user's motion in image space;

FIG. 8 is a schematic flowchart illustrating a first method of detecting if detected inter-image motion satisfies predetermined motion criteria;

FIGS. 9A to 9D schematically illustrates the application of an inter-frame motion threshold to motion bitmaps;

FIG. 10 is a schematic flowchart illustrating a second method of detecting if detected inter-image motion satisfies predetermined motion criteria;

FIGS. 11A and 11B schematically illustrate displacement vectors generated to represent inter-frame changes in image regions where inter-frame motion is detected;

FIG. 12 is a schematic flowchart illustrating a method of detecting if received audio data comprises audio signals satisfying predetermined audio criteria;

FIG. 13 is a schematic illustration of an audio signal exceeding an amplitude threshold;

FIGS. 14A and 14B schematically illustrate an example application utilising the invention in which a user bursts on screen bubbles using hand claps in the field of view of a webcam or video camera.

Figure 1:
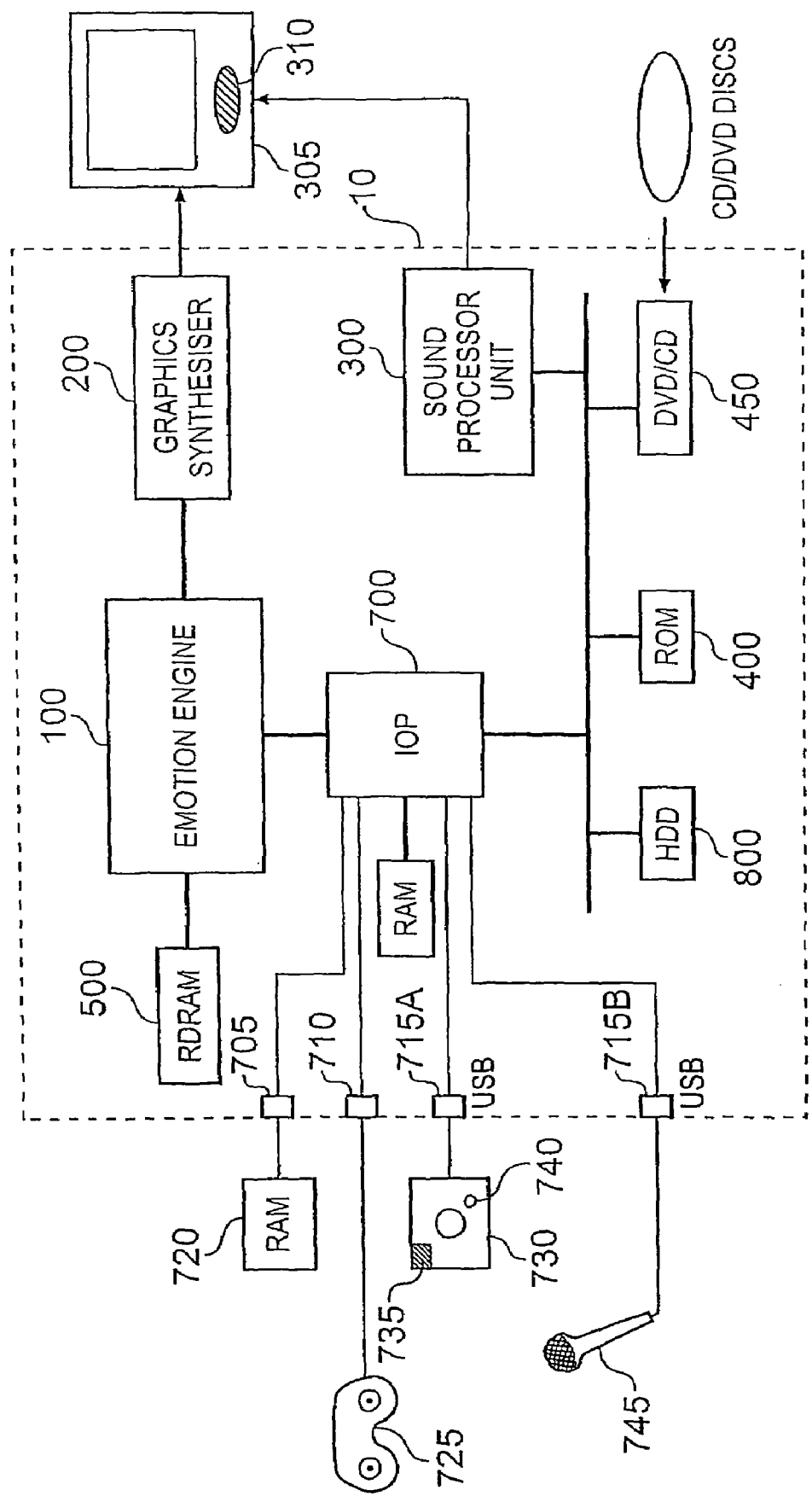

FIG. 1 schematically illustrates the overall system architecture of the PlayStation2. A system unit 10 is provided, with various peripheral devices connectable to the system unit.

The system unit 10 comprises: an Emotion Engine 100; a Graphics Synthesiser 200; a sound processor unit 300 having dynamic random access memory (DRAM); a read only memory (ROM) 400; a compact disc (CD) and digital versatile disc (DVD) reader 450; a Rambus Dynamic Random Access Memory (RDRAM) unit 500; an input/output processor (IOP) 700 with dedicated RAM 750. An (optional) external hard disk drive (HDD) 800 may be connected.

The input/output processor 700 has two Universal Serial Bus (USB) ports 715A and 715B and an ilink or IEEE 1394 port (iLink is the Sony Corporation implementation of IEEE 1394 standard). The IOP 700 handles all USB, iLink and game controller data traffic. For example when a user is playing a game, the IOP 700 receives data from the game controller and directs it to the Emotion Engine 100 which updates the current state of the game accordingly. The IOP 700 has a Direct Memory Access (DMA) architecture to facilitate rapid data transfer rates. DMA involves transfer of data from main memory to a device without passing it through the CPU. The USB interface is compatible with Open Host Controller Interface (OHCI) and can handle data transfer rates of between 1.5 Mbps and 12 Mbps. Provision of these interfaces mean that the PlayStation2 is potentially compatible with peripheral devices such as video cassette recorders (VCRs), digital cameras, set-top boxes, printers, keyboard, mouse and joystick.

Generally, in order for successful data communication to occur with a peripheral device connected to a USB port 715A or 715B, an appropriate piece of software such as a device driver should be provided. Device driver technology is very well known and will not be described in detail here, except to say that the skilled man will be aware that a device driver or similar software interface may be required in the embodiment described here.

In the present embodiment, a video camera 730 with an associated microphone 735 and an LED indicator 740 is connected to a USB port 715A. Although various types of video camera may be used, a particularly suitable type of video camera 735 is a so-called "webcam", that is, a medium-resolution camera based on a single charge-coupled device (CCD) element and including a basic hardware-based real-time data compression and encoding arrangement, so that compressed video and audio data are transmitted by the camera 730 to the USB port 715A in an appropriate format, such as an intra-image based MPEG (Motion Picture Expert Group) standard, for decoding at the PlayStation 2 system unit 10.

The camera LED indicator 740 is arranged to receive control data via the USB data connection to the system unit 10. The CPU 102 can send a control signal via this route to set the LED to an "off" mode, a "steady on" mode and a "flashing" mode in which the LED flashes at a rate of between, say, 1 and 3 flashes per second. The logic required to cause the LED to flash is provided in the camera circuitry, so it is not necessary for the system unit 10 to instruct each individual flash of the LED.

In an alternative embodiment of the invention, rather than using a microphone built into the webcam, a stand-alone microphone 745 is provided. A stand-alone microphone may be placed closer to a user than a built in webcam microphone, thus providing improved quality sound input to the system. Where a stand-alone microphone is provided, it can be coupled to the system via a second USB port 715B.

Apart from the USB ports, two other ports 705, 710 are proprietary sockets allowing the connection of a proprietary non-volatile RAM memory card 720 for storing game-related information, a hand-held game controller 725 or a device (not shown) mimicking a hand-held controller, such as a dance mat.

The Emotion Engine 100 is a 128-bit Central Processing Unit (CPU) that has been specifically designed for efficient simulation of 3 dimensional (3D) graphics for games applications. The Emotion Engine components include a data bus, cache memory and registers, all of which are 128-bit. This facilitates fast processing of large volumes of multi-media data. Conventional PCs, by way of comparison, have a basic 64-bit data structure. The floating point calculation performance of the PlayStation2 is 6.2 GFLOPs. The Emotion Engine also comprises MPEG2 decoder circuitry which allows for simultaneous processing of 3D graphics data and DVD data. The Emotion Engine performs geometrical calculations including mathematical transforms and translations and also performs calculations associated with the physics of simulation objects, for example, calculation of friction between two objects. It produces sequences of image rendering commands which are subsequently utilised by the Graphics Synthesiser 200. The image rendering commands are output in the form of display lists. A display list is a sequence of drawing commands that specifies to the Graphics Synthesiser which primitive graphic objects (e.g. points, lines, triangles, sprites) to draw on the screen and at which co-ordinates. Thus a typical display list will comprise commands to draw vertices, commands to shade the faces of polygons, render bitmaps and so on. The Emotion Engine 100 can asynchronously generate multiple display lists.

The Graphics Synthesiser 200 is a video accelerator that performs rendering of the display lists produced by the Emotion Engine 100. The Graphics Synthesiser 200 includes a graphics interface unit (GIF) which handles, tracks and manages the multiple display lists. The rendering function of the Graphics Synthesiser 200 can generate image data that supports several alternative standard output image formats, i.e., NTSC/PAL, High Definition Digital TV and VESA. In general, the rendering capability of graphics systems is defined by the memory bandwidth between a pixel engine and a video memory, each of which is located within the graphics processor. Conventional graphics systems use external Video Random Access Memory (VRAM) connected to the pixel logic via an off-chip bus which tends to restrict available bandwidth. However, the Graphics Synthesiser 200 of the PlayStation2 provides the pixel logic and the video memory on a single high-performance chip which allows for a comparatively large 38.4 Gigabyte per second memory access bandwidth. The Graphics Synthesiser is theoretically capable of achieving a peak drawing capacity of 75 million polygons per second. Even with a full range of effects such as textures, lighting and transparency, a sustained rate of 20 million polygons per second can be drawn continuously. Accordingly, the Graphics Synthesiser 200 is capable of rendering a film-quality image.

The Sound Processor Unit (SPU) 300 is effectively the soundcard of the system which is capable of recognising 3D digital sound such as Digital Theater Surround (DTS®) sound and AC-3 (also known as Dolby Digital) which is the sound format used for digital versatile disks (DVDs).

A display and sound output device 305, such as a video monitor or television set with an associated loudspeaker arrangement 310, is connected to receive video and audio signals from the graphics synthesiser 200 and the sound processing unit 300.

The main memory supporting the Emotion Engine 100 is the RDRAM (Rambus Dynamic Random Access Memory) module 500 produced by Rambus Incorporated. This RDRAM memory subsystem comprises RAM, a RAM controller and a bus connecting the RAM to the Emotion Engine 100.

Figure 2:
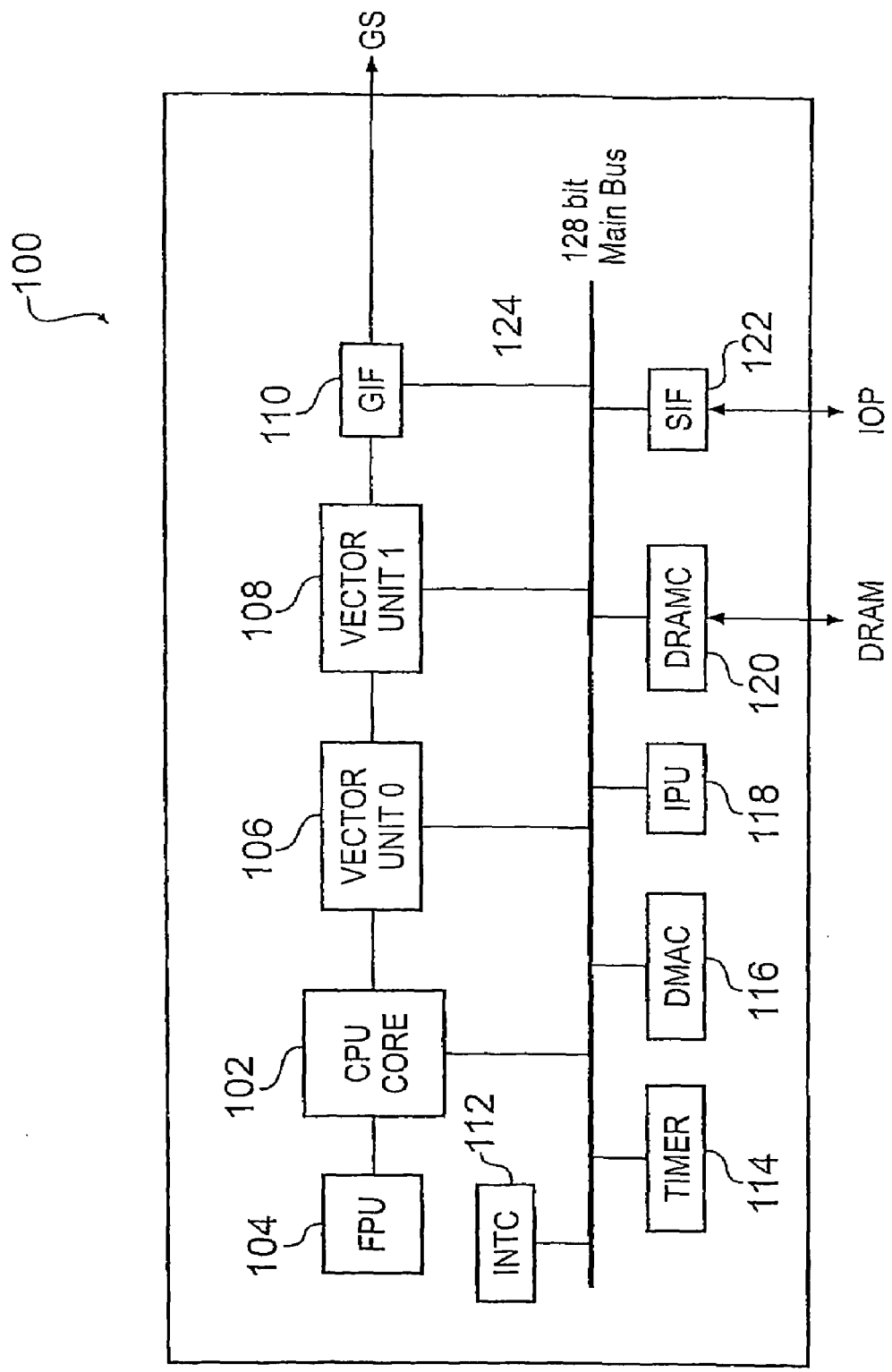

FIG. 2 schematically illustrates the architecture of the Emotion Engine 100 of FIG. 1. The Emotion Engine 100 comprises: a floating point unit (FPU) 104; a central processing unit (CPU) core 102; vector unit zero (VU0) 106; vector unit one (VU1) 108; a graphics interface unit (GIF) 110; an interrupt controller (INTC) 112; a timer unit 114; a direct memory access controller 116; an image data processor unit (IPU) 116; a dynamic random access memory controller (DRAMC) 120; a sub-bus interface (SIF) 122; and all of these components are connected via a 128-bit main bus 124.

The CPU core 102 is a 128-bit processor clocked at 300 MHz. The CPU core has access to 32 MB of main memory via the DRAMC 120. The CPU core 102 instruction set is based on MIPS III RISC with some MIPS IV RISC instructions together with additional multimedia instructions. MIPS III and IV are Reduced Instruction Set Computer (RISC) instruction set architectures proprietary to MIPS Technologies, Inc. Standard instructions are 64-bit, two-way superscalar, which means that two instructions can be executed simultaneously. Multimedia instructions, on the other hand, use 128-bit instructions via two pipelines. The CPU core 102 comprises a 16 KB instruction cache, an 8 KB data cache and a 16 KB scratchpad RAM which is a portion of cache reserved for direct private usage by the CPU.

The FPU 104 serves as a first co-processor for the CPU core 102. The vector unit 106 acts as a second co-processor. The FPU 104 comprises a floating point product sum arithmetic logic unit (FMAC) and a floating point division calculator (FDIV). Both the FMAC and FDIV operate on 32-bit values so when an operation is carried out on a 128-bit value (composed of four 32-bit values) an operation can be carried out on all four parts concurrently. For example adding 2 vectors together can be done at the same time.

The vector units 106 and 108 perform mathematical operations and are essentially specialised FPUs that are extremely fast at evaluating the multiplication and addition of vector equations. They use Floating-Point Multiply-Adder Calculators (FMACs) for addition and multiplication operations and Floating-Point Dividers (FDIVs) for division and square root operations. They have built-in memory for storing micro-programs and interface with the rest of the system via Vector Interface Units (VIFs). Vector Unit Zero 106 can work as a coprocessor to the CPU core 102 via a dedicated 128-bit bus 124 so it is essentially a second specialised FPU. Vector Unit One 108, on the other hand, has a dedicated bus to the Graphics synthesiser 200 and thus can be considered as a completely separate processor. The inclusion of two vector units allows the software developer to split up the work between different parts of the CPU and the vector units can be used in either serial or parallel connection.

Vector unit zero 106 comprises 4 FMACS and 1 FDIV. It is connected to the CPU core 102 via a coprocessor connection. It has 4 Kb of vector unit memory for data and 4 Kb of micro-memory for instructions. Vector unit zero 106 is useful for performing physics calculations associated with the images for display. It primarily executes non-patterned geometric processing together with the CPU core 102.

Vector unit one 108 comprises 5 FMACS and 2 FDIVs. It has no direct path to the CPU core 102, although it does have a direct path to the GIF unit 110. It has 16 Kb of vector unit memory for data and 16 Kb of micro-memory for instructions. Vector unit one 108 is useful for performing transformations. It primarily executes patterned geometric processing and directly outputs a generated display list to the GIF 110.

The GIF 110 is an interface unit to the Graphics Synthesiser 200. It converts data according to a tag specification at the beginning of a display list packet and transfers drawing commands to the Graphics Synthesiser 200 whilst mutually arbitrating multiple transfer. The interrupt controller (INTC) 112 serves to arbitrate interrupts from peripheral devices, except the DMAC 116.

The timer unit 114 comprises four independent timers with 16-bit counters. The timers are driven either by the bus clock (at $\frac{1}{16}$ or $\frac{1}{256}$ intervals) or via an external clock. The DMAC 116 handles data transfers between main memory and peripheral processors or main memory and the scratch pad memory. It arbitrates the main bus 124 at the same time. Performance optimisation of the DMAC 116 is a key way by which to improve Emotion Engine performance. The image processing unit (IPU) 118 is an image data processor that is used to expand compressed animations and texture images. It performs I-PICTURE Macro-Block decoding, colour space conversion and vector quantisation. Finally, the sub-bus interface (SIF) 122 is an interface unit to the IOP 700. It has its own memory and bus to control I/O devices such as sound chips and storage devices.

Figure 3:
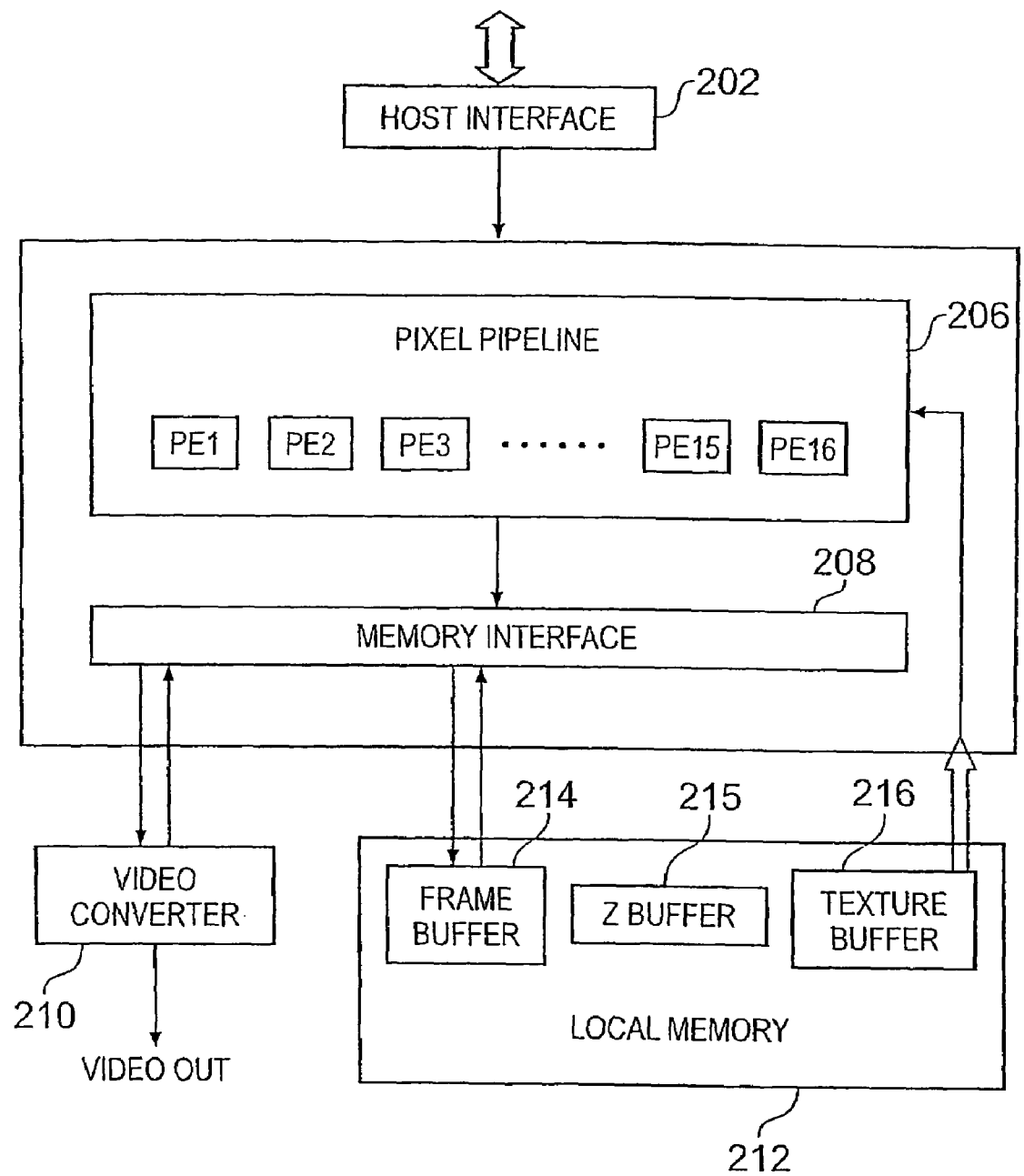

FIG. 3 schematically illustrates the configuration of the Graphic Synthesiser 200. The Graphics Synthesiser comprises: a host interface 202; a set-up/rasterizing unit 204; a pixel pipeline 206; a memory interface 208; a local memory 212 including a frame page buffer 214 and a texture page buffer 216; and a video converter 210.

The host interface 202 transfers data with the host (in this case the CPU core 102 of the Emotion Engine 100). Both drawing data and buffer data from the host pass through this interface. The output from the host interface 202 is supplied to the graphics synthesiser 200 which develops the graphics to draw pixels based on vertex information received from the Emotion Engine 100, and calculates information such as RGBA value, depth value (i.e. Z-value), texture value and fog value for each pixel. The RGBA value specifies the red, green, blue (RGB) colour components and the A (Alpha) component represents opacity of an image object. The Alpha value can range from completely transparent to totally opaque. The pixel data is supplied to the pixel pipeline 206 which performs processes such as texture mapping, fogging and Alpha-blending (as explained below) and determines the final drawing colour based on the calculated pixel information.

The pixel pipeline 206 comprises 16 pixel engines PE1, PE2 ... PE16 so that it can process a maximum of 16 pixels concurrently. The pixel pipeline 206 runs at 150 MHz with 32-bit colour and a 32-bit Z-buffer. The memory interface 208 reads data from and writes data to the local Graphics Synthesiser memory 212. It writes the drawing pixel values (RGBA and Z) to memory at the end of a pixel operation and reads the pixel values of the frame buffer 214 from memory. These pixel values read from the frame buffer 214 are used for pixel test or Alpha-blending. The memory interface 208 also reads from local memory 212 the RGBA values for the current contents of the frame buffer. The local memory 212 is a 32 Mbit (4 MB) memory that is built-in to the Graphics Synthesiser 200. It can be organised as a frame buffer 214, texture buffer 216 and a 32-bit Z-buffer 215. The frame buffer 214 is the portion of video memory where pixel data such as colour information is stored.

The Graphics Synthesiser uses a 2D to 3D texture mapping process to add visual detail to 3D geometry. Each texture may be wrapped around a 3D image object and is stretched and skewed to give a 3D graphical effect. The texture buffer is used to store the texture information for image objects. The Z-buffer 215 (also known as depth buffer) is the memory available to store the depth information for a pixel. Images are constructed from basic building blocks known as graphics primitives or polygons. When a polygon is rendered with Z-buffering, the depth value of each of its pixels is compared with the corresponding value stored in the Z-buffer. If the value stored in the Z-buffer is greater than or equal to the depth of the new pixel value then this pixel is determined visible so that it should be rendered and the Z-buffer will be updated with the new pixel depth. If however the Z-buffer depth value is less than the new pixel depth value the new pixel value is behind what has already been drawn and will not be rendered.

The local memory 212 has a 1024-bit read port and a 1024-bit write port for accessing the frame buffer and Z-buffer and a 512-bit port for texture reading. The video converter 210 is operable to display the contents of the frame memory in a specified output format.

Figure 4:
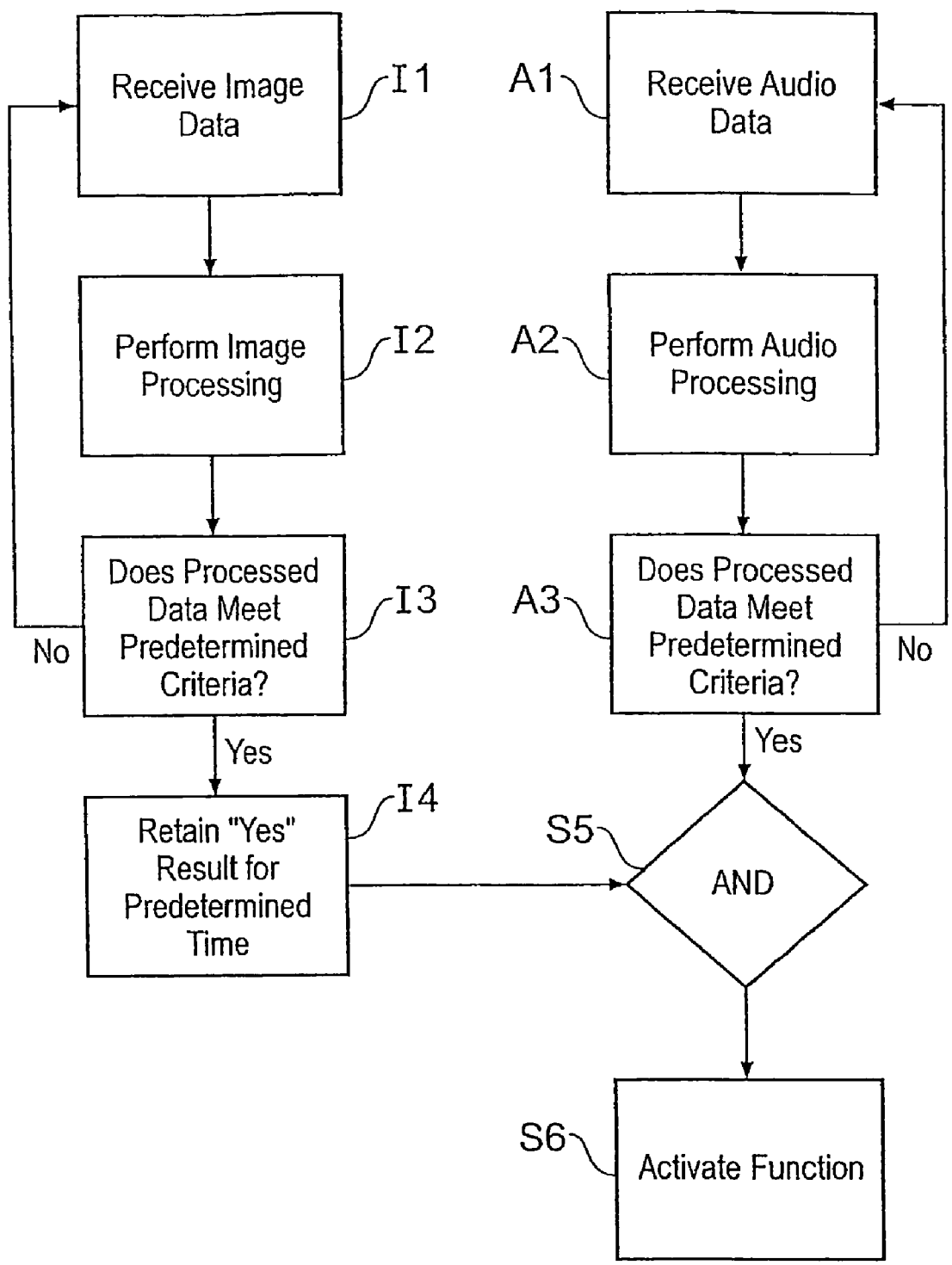
FIG. 4 is a schematic flowchart illustrating the activation of a function on the basis of received video and audio data.

FIG. 4 schematically illustrates image and audio processing steps which can be used to determine whether a function of the PlayStation2 will be activated at a given time. The purpose of this procedure is to examine received audio and video data and determine from it whether or not a user is performing an action, such as a hand clap, intended to result in the activation of a function of the PlayStation2.

Image data processing starts at a step I1, where image data is received at the PlayStation2 from a video source such as a video camera (e.g. the webcam 730) or a data storage medium (e.g. a video cassette recorder or the hard disk drive 800). At a step I2, the PlayStation2 Emotion Engine performs predetermined image processing operations on the received image data to extract the information required to be able to make a determination as to whether predetermined motion criteria have been satisfied in respect of the received data. The image processing steps used will be depend upon the information required, which will in turn depend upon the chosen motion criteria.

At a step I3, the PlayStation2 Emotion Engine determines whether or not the processed image data (in combination with previously processed image data) meets predetermined criteria. It should be understood that the predetermined motion criteria can not be met on the basis of a single received image, since inter-image motion can only be ascertained on the basis of multiple images. Instead, determination is made on the basis of each image and the result of a similar determination for preceding images. If the processed image data does not meet the predetermined criteria then the function will not be activated at this time even if the predetermined audio criteria are satisfied. If this is the case, then operation will return to the step I1, where a subsequent image will be received. Alternatively, if the processed image data does meet the predetermined criteria then, at a step I4, a "yes" result is retained (latched) for a predetermined period of time. If within this predetermined time the predetermined audio criteria are satisfied in respect of received audio data, then at a step S5 a logical AND operation will take the two "yes" inputs and output a control signal to activate the control function at a step S6.

Processing of audio data starts at a step A1, where audio data is received from an audio source such as the microphone 745. The microphone may be either the stand-alone microphone 745 or built in to the webcam 730. At a step A2, audio processing takes place on the received audio data. As with the processing of the received image data, the particular audio processing operations required will depend on the requirements of the PlayStation2 software application. At a step A3, it is determined whether the processed audio data meets predetermined criteria. If the processed audio data does not meet the predetermined criteria, the function will not be activated at this time and audio processing will return to the step A1. If, on the other hand, the processed audio data does meet the predetermined criteria, a "yes" result will be generated and passed to a logical AND at a step S5. Therefore, it can be seen that when audio data meets predetermined criteria during a time window generated at the step 14 of the image processing operations, then the simultaneous receipt of two "yes" signals at the inputs of the logical AND gate will result in a control signal being passed to activate a given function of the PlayStation2. The skilled man will appreciate that although the term "simultaneous" has been used in the context of an AND gate, in other embodiments the "yes" signals (or their equivalents) could be generated at different times but in respect of the same temporal portions, or overlapping temporal portions, or very close temporal portions (e.g. within a threshold separation) of the audio and video data. These could still be taken to be "simultaneous" detection, and a positive detection in respect of the audio and video data in this arrangement would lead to activation of the controlled function.

Figure 5:
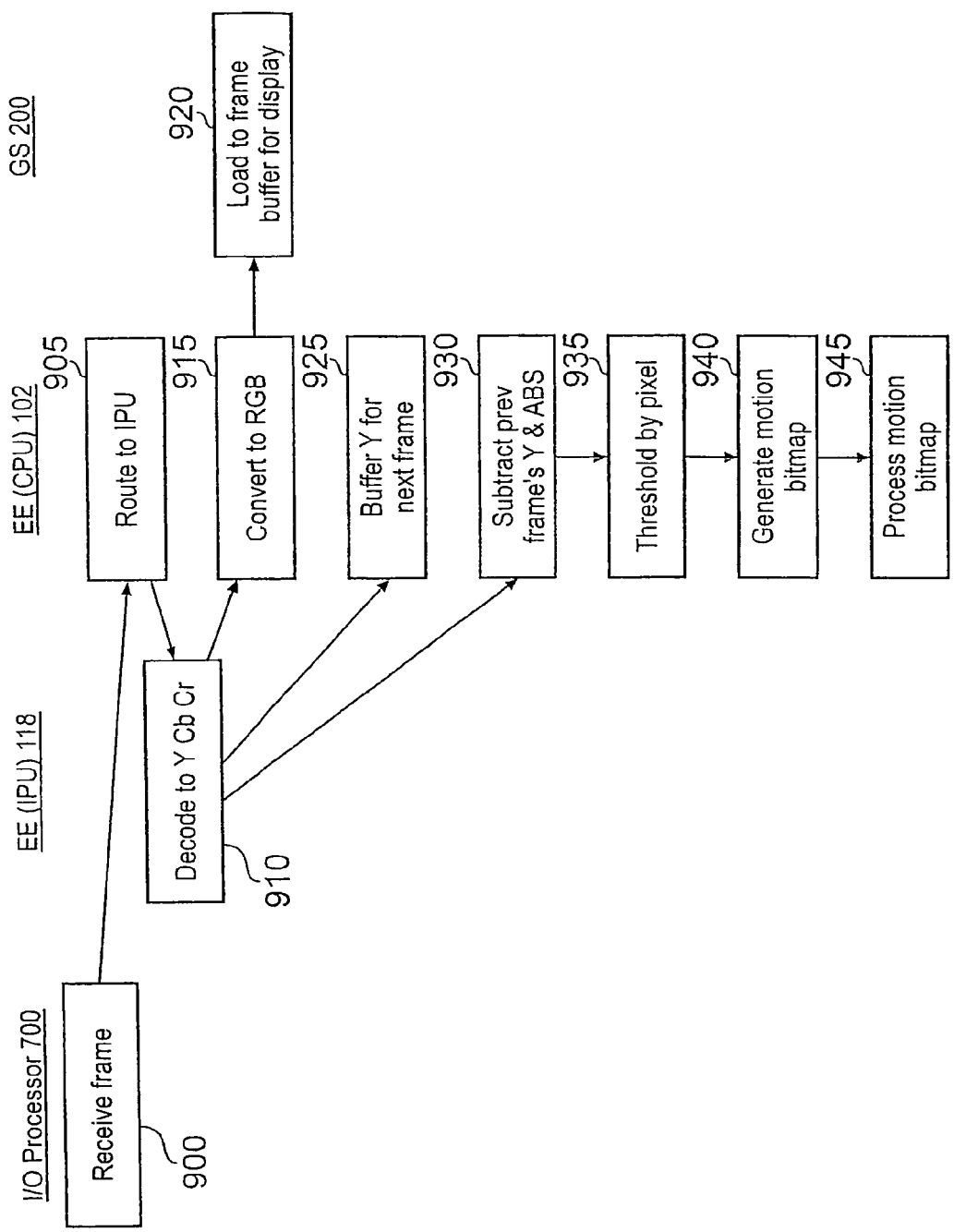
FIG. 5 is a schematic flowchart illustrating the generation of a motion bitmap.

FIG. 5 is a schematic flow chart illustrating the handling of image data from the camera, including the generation of a motion bitmap. A motion bit map is used in the techniques to be described below, which allow control of various data processing functions of the PlayStation 2 system unit 10 via movements of the user in front of the camera 730.

The steps illustrated in FIG. 5 are carried out by various different parts of the system. In general terms these are: the IOP 700, the Emotion Engine (IPU) 118, the Emotion Engine (CPU) 102 and the graphics synthesiser 200. FIG. 5 is arranged as four columns, each column corresponding to operations carried out by one of these parts.

The steps shown in FIGS. 4, 5, 8 and 10 are carried out under control of software stored on a DVD disk and read by the reader 450, although software received over a network connection such as an internet connection (not shown) may be used instead. They are repeated for each image (e.g., a progressive-scanned frame) received from the camera 730. The image rate may be set within the operating software of the PlayStation 2 system unit 10. An example image rate which may be suitable is a rate of 50 frames per second.

At a step 900, the IOP 700 receives data from the camera 730 corresponding to one frame. As mentioned above, this data is in a compressed form such as an intra-image MPEG format. At a step 905, the Emotion Engine 100 reads the frame's worth of image data from the IOP and routes it to the IPU 118.

At a step 910, the IPU 118 decodes the MPEG-encoded image data into a luminance-chrominance (Y, Cb, Cr) format. The Y, Cb, Cr representation of the image is then handled by the Emotion Engine's CPU 102.

At a step 915, the CPU 102 converts the Y, Cb, Cr format data into component (red, green, blue, or RGB) data. The RGB data is passed to the GS 200 which stores the frame in the frame buffer 124 for display (step 920). In the course of the operation of the current game software, it is very likely that the frame of data from the video camera will either be manipulated in some form or will be over-written or overlaid in places by synthesised image data.

A second use of the Y, Cb, Cr data decoded at the step 910 is that at a step 925, the luminance (Y) component is buffered in the RAM 500 for use in connection with the next frame received from the camera 730. The use of this buffered luminance data will become apparent from the following description.

A third use of the Y, Cb, Cr data decoded at the step 910 takes place at a step 930, in which the current frame's luminance (Y) data is subtracted, on a pixel-by-pixel basis, from the buffered luminance data in respect of the preceding frame. An "absolute value" function is applied so that the luminance difference between corresponding pixels of the current and previous frame is established as a set of positive numbers.

At a step 935, the luminance difference is compared with a threshold value, again on a pixel-by-pixel basis. If the luminance difference for a particular pixel position exceeds the threshold value then it is determined that motion took place at that pixel position. If the luminance difference does not exceed the threshold value, it is determined that motion did not take place at that pixel position. In this way, at a step 940, a "motion bit map" is generated, so that each pixel position has an associated flag indicating whether motion was detected at that pixel position.

The motion bit map is stored in the RAM 500. It will be apparent that the motion bit map could be stored in a one-bit-per-pixel format. However, for ease of addressing, the present embodiment actually stores the motion bit map as a 16 bit-per-pixel format, but the underlying information stored in this manner is simply a flag for each pixel indicating either "motion" or "no motion".

One use that may be made of the motion bit map is to allow the user to control data processing operations by initiating motion at a particular part of the image. In order for the user to do this, it is preferred that the image from the webcam is displayed on the display 305. This may be as a full-screen display or as a part of the screen, possibly with some manipulation such as scaling. The main thing, however, is to allow the user to see at least a part of the field of view of the camera 730, so that the user can tell when he is initiating image motion at the correct part of the image.

At a step 945, the motion bitmap is subject to one or more data processing operations to determine whether the detected motion satisfies certain predetermined criteria.

FIG. 6 schematically illustrates a motion bit map. The bit map is shown as a rectangular array 1000 of pixel flags, which are located, for the purposes of the illustration, at positions in the array corresponding to the spatial position of that pixel in the image. However, it will be appreciated that this is merely a schematic view of the motion bit map. In practice, an appropriate memory area having the same number of memory entries (e.g., addressable data words or sub-divisions of addressable data words) as the number of pixels in the image is required.

In FIG. 6, a pixel position at which motion was detected is shown schematically as a dark dot. In one embodiment, a test window 1010 is also provided, as illustrated here by a dotted line.

A test window is required if motion needs to be detected corresponding to a particular screen area rather than simply anywhere in the field of view of the camera for a function to be activated. If this is the case then the predetermined motion criteria will relate only to detected motion within the test window. For an example, activation of a function of the PlayStation2 may only be desired if a user is to clap his hands at a position corresponding to a particular screen area.

FIGS. 7A to 7C illustrate how the actions of the user within the field of view of the webcam 730 attached to the PlayStation2 can be detected as motion.

FIG. 7A schematically illustrates a user 1100 at a time when a clapping motion commences. At this moment, the distance between the user's hands 1110a and 1120a is at a maximum. This is illustrated in image space in FIG. 7C, where the position of the user's hands is represented by the dotted circles 1110c and 1120c.

FIG. 7B schematically illustrates the user 1100 at a time when the clapping motion has terminated. At this moment, the user's hands 1110a and 1120a are in contact with one another. This situation is illustrated in image space in FIG. 7C, where the representations of the user's hands 1110d and 1120d can be seen to have coalesced. The arrows 1130 in FIG. 7C illustrate the path of motion of the user's hands 1110a and 1120a. The form of detected motion shown in FIG. 7C is an example of motion which may be detected in order for a desired function of the PlayStation2 to be initiated. It should of course be understood that it is not the position of the user's hands which is being measured directly, but instead the position where motion is detected.

FIG. 8 schematically illustrates a method of detecting whether detected inter-image motion satisfies predetermined motion criteria. The procedure starts at a step C1. At a step C2, two counters A and B are initialised to a predetermined value, e.g. 0. Subsequently, at a step C3, a motion bitmap is received at the PlayStation2 ready for processing. At a step C4, it is determined whether the level of motion in the received motion bitmap exceeds a certain threshold. This step is described in more detail later with reference to FIGS. 9A to 9D. If the threshold is not exceeded then the process returns to the step C1 where the procedure starts afresh.

Alternatively, if the level of motion is above the threshold, then the process continues on to a step C5 where the counter A, which indicates the number of successive motion bitmaps for which the threshold has been exceeded, is incremented. At a step C6, another motion bitmap is received at the PlayStation2. At a step C7, it is determined whether the level of motion of the new motion bitmap is above the threshold, and if so, processing is returned to the step C5 where the counter A is incremented.

Alternatively, if it is determined that the level of motion of the motion bitmap is not above a certain threshold at the step C7, then processing continues on to a step C8 where it is determined whether the counter A exceeds a predetermined value, x. If the counter A does not exceed value x, this indicates that an insufficient number of motion bitmaps exceeding the threshold have been received for motion criteria to be satisfied (e.g. the motion threshold has not been exceeded for a sufficient duration), and processing moves on to a step C9 where the second counter, counter B, which keeps track of the number of received motion bitmaps having a level of motion falling below the threshold, is incremented.

Processing then continues on to a step C10 where it is determined if the value of the counter B is greater than a predetermined value y. If it is, a sufficient number of motion bitmaps for which the threshold has not been exceeded have been received to provide confidence that no motion which might meet the motion criteria is occurring. Processing then returns to the step C1 where the process starts afresh. If the value of the counter B is less than the predetermined value y, this means that an insufficient number of motion bitmaps for which the threshold has been exceeded have been received to provide confidence that no motion which might meet the motion criteria is occurring. In this case it is undesirable to reset the procedure and so processing returns to the step C6 where another motion bitmap is received.

If at the step C8 it is determined that the counter A does exceed the predetermined value x, then control passes on to a step C11 which passes the result that all motion criteria are satisfied.

It can therefore be understood from FIG. 8 that the steps C1 to C4 seek to identify a first motion bitmap with a level of motion exceeding a threshold, whilst the steps C5 to C7 seek to keep track of subsequent motion bitmaps in which the level of motion exceeds the threshold. Further, the steps C8 to C10 deal with subsequent motion bitmaps for which the level of motion does not exceed the threshold.

FIGS. 9A to 9D schematically illustrate the application of an inter-frame motion threshold to the series of successive motion bitmaps.

Figure 9A:
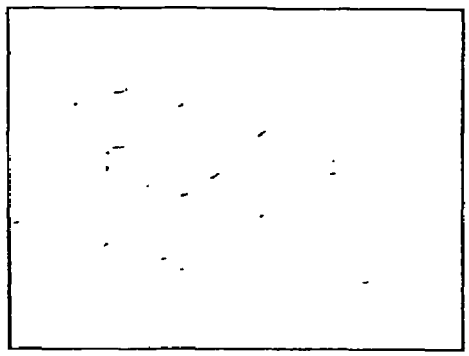

In FIG. 9A, a motion bitmap is shown in which the only motion detected is noise resulting from data processing artefacts and/or normal (non-trigger) movement within the field of view of the webcam 730. Here, only a low density of motion flagged pixels (indicated by dark dots) is present in the motion bitmap.

Figure 9B:
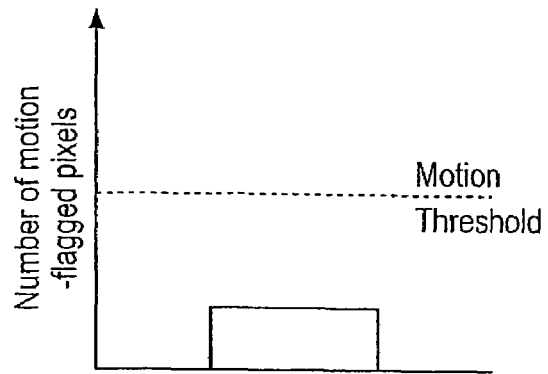

FIG. 9B schematically shows the level of motion exhibited by the motion bitmap of FIG. 9A compared against a motion threshold. It can be seen here that the level of motion present is less than the motion threshold.

Figure 9C:
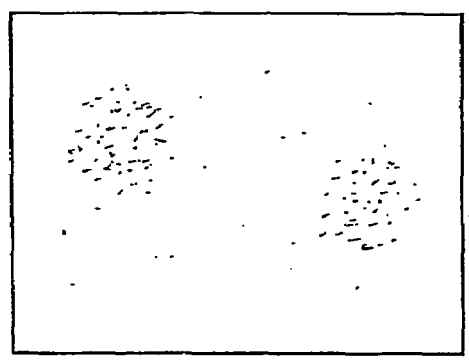

FIG. 9C shows a motion bitmap in which, in addition to the background motion, there are two regions in which increased motion is present. These areas of increased motion could represent the motion of two hands. It is not possible using the present procedure to ascertain a direction of motion on the basis of a single motion bitmaps. To extract directional information requires a comparison of multiple motion bitmaps.

Figure 9D:
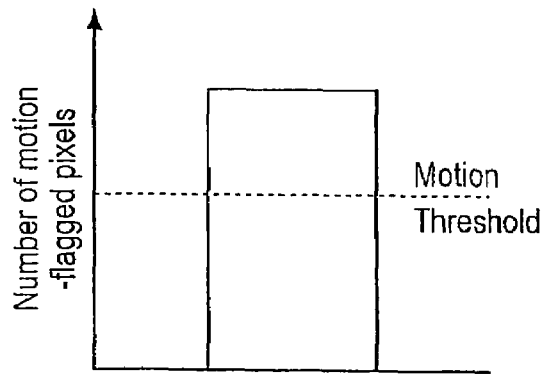

FIG. 9D shows that when the same motion threshold is applied to the bitmap of FIG. 9C, the threshold is exceeded.

FIG. 10 is a schematic flowchart illustrating an alternative method of detecting if detected inter-image motion satisfies predetermined motion criteria. This embodiment identifies multiple regions of a received image where motion is taking place and identifies the changes in position of those regions between one received image and successive received images.

This process starts with a step E1 where motion bitmaps are received. The flagged pixels of a received motion bitmap are clustered into k groups, k being a predetermined integer. The skilled man will appreciate that there are a wide variety of methods of clustering pixels into groups. Some examples of clustering algorithms include hierarchical clustering (agglomerative and divisive methods) and the well-known K-means algorithm. In this example embodiment, a form of K-means clustering is used as described below.

Each motion bitmap will comprise a number, n of flagged pixels representing image locations where motion has been detected. Each flagged pixel in the motion bitmap is represented by a position vector $x_1, x_2 \ldots x_n$. The algorithm must allocate each of these n pixels to a cluster. In the present embodiment, a hand-clap motion needs to be detected. From FIGS. 7A to 7C it can be seen that at the start of a typical hand-clap there are two spatially separated regions (the users hands) which need to be detected. Alternatively, a hand-clap may only involve the motion of one hand (with the other hand remaining stationary). In the present embodiment, motion detection will operate on the basis of a "two handed" clap and so the clustering algorithm can be performed on the premise that there will be two clusters (K=2). If it is desirable that a "one handed" clap be catered for, the same procedure can be repeated (more simply) for K=1.

The first step in the clustering algorithm is to define a estimate cluster mean for each of the two clusters. These can be defined randomly (subject to the constraint that the cluster means are not defined as being very close) or on a more intelligent basis. In the present case, a sensible estimate is to define the cluster mean of one cluster as central to the left hand portion of the motion bitmap, and the cluster mean of the other cluster as central to the right hand portion of the motion bitmap.

Each of the n pixels then needs to be attributed to one or the other of the two clusters. This can be carried out by a procedure such as a minimum distance classifier. That is, for each pixel $x_i$, the distance, D to each cluster mean $m_a$ (where a=1 or 2) needs to be calculated:

$$D=|x_i-m_a|$$

The pixel will be attributed to the cluster for which D is a minimum.

Once all pixels have been attributed to a cluster on this basis, a new cluster mean is calculated from the pixels attributed to the cluster. Following this, each pixel in the motion bitmap is attributed to one or other of the newly generated cluster means. This procedure continues iteratively until both cluster means stabilise (i.e. do not change from one iteration to the next). This algorithm could be enhanced to remove background motion if required. This could be implemented by ignoring flagged pixels beyond a certain distance from the stabilised cluster means.

Once the pixels of the motion bitmap have been clustered into groups at the step E2, the process moves on to a step E3, where the centre point of each cluster of pixels is determined and stored. These centre points are the stabilised cluster means of the step E2. The stored centre points will be held in memory during the processing of the present motion bitmap and a successive motion bitmap. At a step E4, correspondence between each cluster of pixels in the present motion bitmap and a cluster of pixels in a previous motion bitmap will be calculated. The correspondence between present and previous clusters can be determined in a variety of ways, but the simplest method is simply to determine, for each cluster mean in the present motion bitmap, the closest cluster mean from the previous motion bitmap.

Once correspondence between the clusters of pixels has been found, it is then possible, at a step E5, to determine motion vectors representing the inter-frame displacement of clusters. In other words, the position of a given cluster within the present motion bitmap is compared to the position of the corresponding cluster from a previous motion bitmap. The displacement of the two locations can then be calculated and used to define a motion vector. At a step E6, the determined motion vectors are analysed to determined whether they satisfy the predetermined motion criteria. One possible criterion is that the magnitude of the motion vectors exceeds a predetermined value for a predetermined number of frames.

Another possible criterion which may be used where two motion vectors are generated is that the motion vectors remain confined to rectangle defined with one cluster at one corner and the other cluster at the diagonally opposite corner. This criterion means that only motion resulting from the two clusters moving generally towards one another may lead to the activation of the PlayStation2 function. Additional criteria are identified below with reference to FIGS. 11A and 11B.

FIGS. 11A and 11B schematically illustrate the generation of a motion vector from two motion bitmaps using the process outlined with reference to FIG. 10.

In FIG. 11A, a first motion bitmap 1210 and a second motion bitmap 1220, the second motion bitmap 1220 being received by the apparatus subsequently to the first motion bitmap 1210, both contain a single image region where motion has taken place. It can be seen that the location of the image region where motion has taken place has moved between motion bitmap 1210 and motion bitmap 1220. The movement of the image region between these two received frames is determined and used to generate a motion vector 1230. It is this motion vector that will be used to determine whether the predetermined motion criteria have been satisfied. In this example the motion vector may represent the "single hand" clap case.

In FIG. 11B, each of two successively received motion bitmaps 1250 and 1260 contain two image regions where motion has taken place. A correspondence is determined between each of the image regions is 1250 and each of the image regions in 1260. When this determination has been made, it is then possible to calculate motion vectors representing the displacement between motion bitmaps 1250 and 1260 for each of the respective image regions. It can be seen from a comparison of the first motion bitmap 1250 and the second motion bitmap 1260 that the image regions containing motion are moving towards one another. This is represented by motion vectors 1270 and 1280 which are directed towards one another. In this example the motion vector may represent the "two hand" clap case. One criterion that could be used as one of the predetermined motion criteria is that the motion vectors of a plurality of groups of pixels converge, representing the coalescence of the two image regions.

FIG. 12 is a schematic flowchart illustrating a method of detecting whether received audio data comprises audio signals satisfying predetermined audio criteria. This process starts at a step G1 where audio data is received at the PlayStation2 from a microphone. If the received audio data is already in a format in which analysis in the time amplitude domain can be carried out, then no format conversion is necessary. Otherwise, format conversion may need to take place.

At a step G2, any signals having amplitude which exceeds a predetermined threshold will be detected. Any audio signals exceeding the threshold will be passed on to a step G3, where the duration $t_h$ for which the threshold is exceeded is determined. At a step G4, it is determined whether the duration $t_h$ measured at the step G3 is of a value between a and b, a and b being predetermined values. If $a \leq t_h \leq b$, then the predetermined audio criteria are satisfied. The predetermined value a should be defined as great enough to filter noise spikes but not so great as to ignore valid sound triggers. The predetermined value b should be set to an appropriate value for a valid trigger.

FIG. 13 schematically illustrates a signal having an amplitude envelope which exceeds a threshold amplitude $A_{Thr}$. It can be seen that the threshold amplitude $A_{Thr}$ is exceeded for a time period between time $t_1$ and time $t_2$. Applying this signal to the process described in FIG. 12, if the duration between $t_1$ and $t_2$ falls between the values a and b, then the predetermined audio criteria will be satisfied. On the other hand, if the time period between $t_1$ and $t_2$ is either less than a or greater than b, then the audio criteria will not be satisfied even though the threshold amplitude has been exceeded.

It should be understood that the predetermined audio criteria may be defined other than in terms of the signal amplitude exceeding a predetermined threshold for a predetermined duration, and could instead for example be defined in terms of a required spectral signature. In this case, the apparatus would need to process the audio data in such a way as to determined whether the spectral characteristics of the audio signal satisfy predetermined parameters.

FIGS. 14A and 14B illustrate an example application of the present invention. The example application is that of a video game where bubbles 1310 appearing on the screen are burst in response to the actions of the user. In this case, the action of the user resulting in the bursting of a bubble on-screen will be that of a hand clap within the field of view of the webcam 730. The detected motion will result in an on-screen display of graphic elements 1320 representing the hands of the user. It should be appreciated that in this case it is not enough simply to detect that a clap has taken place, it is further necessary to determine whether the clapping motion has taken place at an image region corresponding to the location of the bubble within the game. The presence of the graphic representation of the user's hands 1320 allows the user to know whether his hands are in the correct place. In an alternative embodiment, instead of displaying a graphic representation of the user's hands, it is possible to overlay the image of the user received from the webcam 730 onto the game area of the video game screen. In either case, the predetermined motion criteria will be that of the user's two hands being brought together and coalescing at an image region corresponding to a target bubble, as shown in FIG. 14B. The corresponding predetermined audio criteria should be met within a predetermined period of time from the predetermined motion criteria having been met. If this is the case, then the function of the bubble bursting will be activated as seen in FIG. 14B.

The invention claimed is:

1. Data processing apparatus arranged to process successive video images and an associated audio signal; the apparatus comprising:
   means for detecting inter-image motion in the successive video images;
   means for detecting whether the inter-image motion satisfies one or more predetermined motion criteria;
   means for detecting an audio signal pattern in the associated audio signal satisfying one or more predetermined audio criteria;

activation means for activating a control function of the data processing apparatus in response to a substantially simultaneous occurrence of:
  (a) a detection of inter-image motion satisfying the one or more predetermined motion criteria; and
  (b) a detection of an audio signal pattern in the associated audio signal which satisfies the one or more predetermined audio criteria; and
means for detecting, for each of a series of successive images, one or more active image regions in each image where inter-image motion has been detected;
in which a predetermined motion criterion is satisfied if at least one of the one or more active image regions is subject to a predetermined displacement between successive images.

2. The apparatus according to claim 1, further comprising:
means for detecting whether a displacement in location of at least one of the active image regions between successive images is greater than a predetermined threshold; and
in which a predetermined motion criterion is satisfied if the displacement in location of at least one active image region remains above the predetermined threshold for N successive images and subsequently falls below the predetermined threshold, N being a predetermined integer.

3. Data processing apparatus arranged to process successive video images and an associated audio signal, the apparatus comprising:
means for detecting inter-image motion in the successive video images;
means for detecting whether the inter-image motion satisfies one or more predetermined motion criteria;
means for detecting an audio signal pattern in the associated audio signal satisfying one or more predetermined audio criteria;
activation means for activating a control function of the data processing apparatus in response to a substantially simultaneous occurrence of:
  (a) a detection of inter-image motion satisfying the one or more predetermined motion criteria; and
  (b) a detection of an audio signal pattern in the associated audio signal which satisfies the one or more predetermined audio criteria; and
means for detecting whether inter-image motion occurs between successive images at a predetermined proportion of a test area defined with respect to the video images; and
in which a predetermined motion criterion is satisfied if inter-image motion occurs between successive images at the predetermined proportion of the test area for N successive images and subsequently falls below the predetermined threshold, N being a predetermined integer.

4. Data processing apparatus arranged to process successive video images and an associated audio signal, the apparatus comprising:
means for detecting inter-image motion in the successive video images;
means for detecting whether the inter-image motion satisfies one or more predetermined motion criteria;
means for detecting an audio signal pattern in the associated audio signal satisfying one or more predetermined audio criteria;
activation means for activating a control function of the data processing apparatus in response to a substantially simultaneous occurrence of:
  (a) a detection of inter-image motion satisfying the one or more predetermined motion criteria; and
  (b) a detection of an audio signal pattern in the associated audio signal which satisfies the one or more predetermined audio criteria; and
means for detecting, for each of a series of the video images, a plurality of active image regions where inter-image motion has been detected;
in which a predetermined motion criterion are satisfied if the displacement of at least two of the active image regions with respect to each other drops below a predetermined value.

5. Data processing apparatus arranged to process successive video images and an associated audio signal, the apparatus comprising:
means for detecting inter-image motion in the successive video images;
means for detecting whether the inter-image motion satisfies one or more predetermined motion criteria;
means for detecting an audio signal pattern in the associated audio signal satisfying one or more predetermined audio criteria; and
activation means for activating a control function of the data processing apparatus in response to a substantially simultaneous occurrence of:
  (a) a detection of inter-image motion satisfying the one or more predetermined motion criteria; and
  (b) a detection of an audio signal pattern in the associated audio signal which satisfies the one or more predetermined audio criteria,
in which a grouping is satisfied if there is a time displacement of less than a threshold amount between time-correlated positions in the audio signal and the sequence of video images at which the audio signal pattern is detected and the motion criteria are met.

6. Data processing apparatus arranged to process successive video images and an associated audio signal, the apparatus comprising:
means for detecting inter-image motion in the successive video images;
means for detecting whether the inter-image motion satisfies one or more predetermined motion criteria;
means for detecting an audio signal pattern in the associated audio signal satisfying one or more predetermined audio criteria;
activation means for activating a control function of the data processing apparatus in response to a substantially simultaneous occurrence of:
  (a) a detection of inter-image motion satisfying the one or more predetermined motion criteria; and
  (b) a detection of an audio signal pattern in the associated audio signal which satisfies the one or more predetermined audio criteria; and
means for detecting if the amplitude of the associated audio signal exceeds a predetermined threshold; and
in which a predetermined audio criterion is satisfied if the amplitude of the associated audio signal remains substantially above the predetermined threshold for at least a predetermined duration.

7. Data processing apparatus arranged to process successive video images and an associated audio signal, the apparatus comprising:
means for detecting inter-image motion in the successive video images;
means for detecting whether the inter-image motion satisfies one or more predetermined motion criteria;
means for detecting an audio signal pattern in the associated audio signal satisfying one or more predetermined audio criteria;

activation means for activating a control function of the data processing apparatus in response to a substantially simultaneous occurrence of:
  (a) a detection of inter-image motion satisfying the one or more predetermined motion criteria; and
  (b) a detection of an audio signal pattern in the associated audio signal which satisfies the one or more predetermined audio criteria; and means for detecting the spectral signature of the associated audio signal;
in which a predetermined audio criterion is satisfied if the determined spectral signature substantially matches predetermined parameters.

* * * * *

UNITED STATES PATENT AND TRADEMARK OFFICE
CERTIFICATE OF CORRECTION

| | | |
|---|---|---|
| PATENT NO. | : 8,135,066 B2 | Page 1 of 1 |
| APPLICATION NO. | : 11/631143 | |
| DATED | : March 13, 2012 | |
| INVENTOR(S) | : Philip Robert Harrison and Peter John Marshall | |

It is certified that error appears in the above-identified patent and that said Letters Patent is hereby corrected as shown below:

On the title page item (73), line 1, "Sony Computer Entertainment Europe td" should read
-- Sony Computer Entertainment Europe LTD --.

Signed and Sealed this
Twenty-sixth Day of November, 2013

Margaret A. Focarino
*Commissioner for Patents of the United States Patent and Trademark Office*